J. A. SHAW.
PROCESS OF RECLAIMING SPENT PICKLING SOLUTIONS.
APPLICATION FILED MAY 19, 1920.
1,384,974.
Patented July 19, 1921.
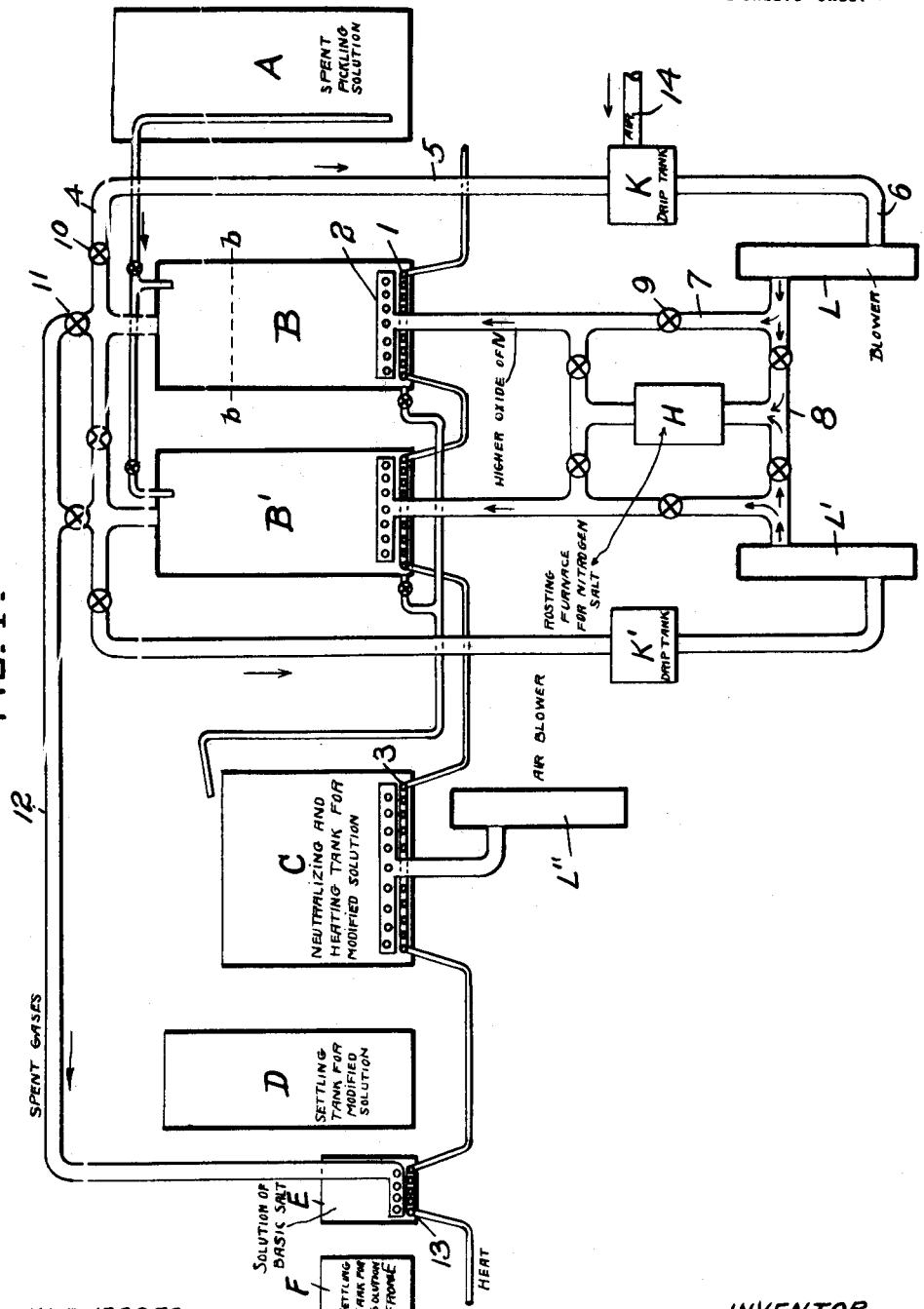
WITNESSES
INVENTOR

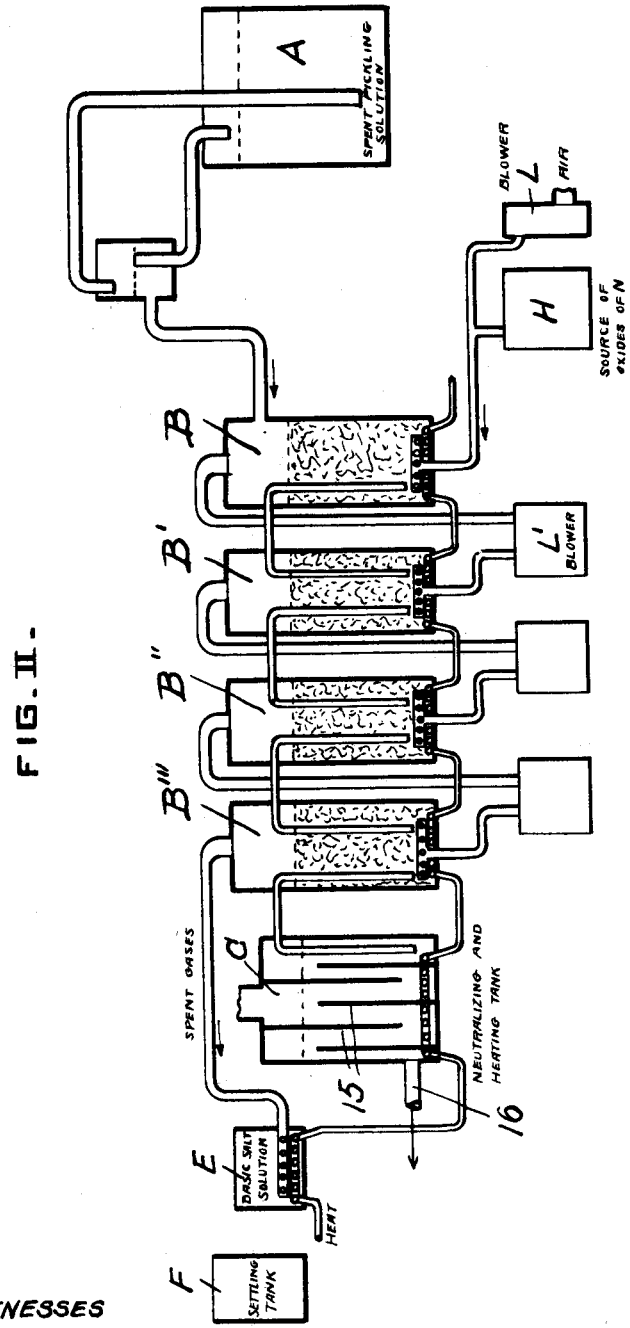

UNITED STATES PATENT OFFICE.

JOSEPH A. SHAW, OF PITTSBURGH, PENNSYLVANIA.

PROCESS OF RECLAIMING SPENT PICKLING SOLUTIONS.

1,384,974. Specification of Letters Patent. Patented July 19, 1921.

Application filed May 19, 1920. Serial No. 382,579.

*To all whom it may concern:*

Be it known that I, JOSEPH A. SHAW, residing at Pittsburgh, in the county of Allegheny and State of Pennsylvania, a citizen of the United States, have invented or discovered certain new and useful Improvements in Processes of Reclaiming Spent Pickling Solutions, of which improvements the following is a specification.

My invention concerns the reclaiming of spent pickling solutions, particularly such as are derived from the pickling of iron and steel articles, or articles made of alloys of which iron is an ingredient.

The pickling solution in ordinary steel-mill practice is essentially dilute sulfuric acid; and the spent solution, as it comes from the pickling vat contains, in solution, a diminished but still appreciable quantity of sulfuric acid and a large quantity of ferrous sulfate, copperas, $FeSO_4$. The disposal of this spent solution is a matter which presents serious difficulties. Though insufficiently active for continued use in the pickling vat, it is still highly destructive to animal and vegetable life, and unsuitable, therefore, to be discharged into streams and rivers. (In many communities, indeed, laws have been passed, forbidding stream pollution in this manner.) The corrosive action of the solution is such as to render its presence in sewers objectionable; if allowed to soak into the ground, not only will it render the ground unproductive, but it may pollute wells in the neighborhood. On the other hand, the spent solution contains valuable ingredients, if only they could be recovered economically. Processes of recovery have been invented, and such processes have been and are being followed, even at financial loss, in order to get rid of this troublesome substance.

My invention consists in a process of recovery capable of being employed to economic advantage. It includes the following steps: (1) The ferrous sulfate, copperas, carried in the spent solution is oxidized to ferric sulfate; (2) this ferric sulfate, remaining in solution, is converted by heating into basic ferric sulfate which, being a less soluble substance, is in part precipitated from the solution; and (3) the solution so relieved of its burden is separated by decantation or filtration and, with suitable additions of fresh acid, is returned to the pickling vat. To these steps are added steps for the recovery of substance employed in effecting the reaction of the first step mentioned above. Incidentally, the sediment of ferric sulfate may be turned to commercial use. The various steps of the operation here indicated are achieved in particular manner, with the use of particular agencies and instrumentalities, and certain economies are practised, all as I am about to describe.

In the course of description I shall refer to the accompanying drawings, in which Figure I shows diagrammatically a plant in which my invention may be practised, and Fig. II shows, in like diagrammatic manner, a convenient arrangement of a portion of the apparatus.

The spent solution, as it comes from the pickling vat, carries with it particles of scale and of carbon and other adventitious material, and this may be removed in any convenient manner, as by filtration. The solution may be collected and stored in a suitable tank A. From tank A, as occasion requires, the solution is pumped into tank B. Two such tanks are shown, in Fig. I, B and B′ arranged in parallel. It suffices to note this multiplication of tanks in parallel arrangement, and to proceed with the description of the operation, as carried forward in a single tank.

Spent solution is pumped into tanks B, B′ in unit charges, and it will immediately be apparent that while material in one tank B is being treated, fresh supplies of spent solution may be entering another tank B′. The size of a unit charge need not be exactly measured; it may conveniently be such as to fill the tank B approximately two thirds full, to the level indicated at *b—b*. The unit quantity so isolated in tank B is heated by convenient means, as steam coil 1, to a temperature above atmospheric but below the boiling point, the acidity adjusted if necessary, and while so heated is blown through with a gas carrying oxygen in loose chemical combination and readily passing over into the nascent state. A pump or blower L is indicated, delivering through a nozzle 2 in the bottom of tank B. A suitable gas of the character indicated is nitric oxid, $NO_2$, for it readily gives up one atom of oxygen and changes in so doing into a lower oxid, NO, for example. A method of generating nitric oxid in sufficient quantities will presently be explained.

I have said that the spent solution is blown through with oxygen-affording gas. The essential condition is an intimate intermingling of solution and gas, and this may very readily be accomplished by blowing the gas through a body of the liquid while otherwise at rest in a tank. Manifestly the same essential condition might be brought about otherwise—for instance, by causing the solution to drip through a stone tower in which an atmosphere of the active gas is maintained.

Under these conditions of temperature and intimate intermingling, the ferrous sulfate in solution oxidizes and becomes ferric sulfate. This step of operation is continued, and the attendant reaction progresses, to a point which will be determined experimentally. Whereupon the solution, modified as already indicated, is pumped to a second tank, C.

In tank C the acid character of the solution is, if necessary, by the introduction of lime, neutralized, and at the same time the temperature is increased, by convenient means, as by steam coil 3, to a degree approximating the boiling point. The liquid as it boils is blown through with air, driven by a suitable blower or pump L'', to remove the remaining traces of nitrogen oxids. As the now neutralized solution boils, the ferric sulfate, hitherto carried in solution, is changed from the normal and soluble form to the basic and less soluble form. By boiling, about two thirds of the sulfate is so precipitated, and when that point is reached (again the determination of the matter is experimental) the contents of tank C are pumped into a third tank D. The liquid then contains in solution some soluble sulfates of iron still, and some free acid; for, incidentally to the change of normal ferric sulfate to basic, some acid radical has been released, to remain in solution.

Tank D is a settling tank. The precipitate is finely divided, and settles at the bottom of tank D as a fine-grained, dense mud, from which the clear liquid above may be decanted. And with the ferric sulfate precipitates calcium sulfate, for it too is a rather insoluble salt.

The decanted liquor is so far reclaimed that, with fresh additions of sulfuric acid it may be returned for effective service to the pickling vat.

The sediment of basic ferric sulfate in tank D is, as has been said, a heavy dense mud or sludge. It is insoluble and inert and may be thrown out on the surface of the ground without creating a nuisance, or it may be turned to economic advantage. It may be roasted, and so converted into sulfuric acid and rouge, useful as a pigment and for polishing purposes; or it may be weathered, and so prepared for gas purification.

It may here be noted parenthetically that the description up to this point has had to do with solutions which have come from the pickling of articles of ordinary iron or steel. If the spent solution comes from the pickling of an alloy, such for instance as nickel steel, it will of course carry nickel salts, as well as iron salts. These nickel salts may be removed by suitable supplementary operations upon the liquor decanted from tank D.

Coming now to the circulation of gas through the tank B, the course of the gas will be seen to be, from tank B, through pipes 4, 5, and 6, to blower L; thence through pipe 7 to the nozzle 2 again. In pipe 7 is a by-pass 8, and in by-pass 8 is a furnace H; and there is a valve 9 in pipe 7 opposite the by-pass, by which the relative flow through the direct line 7 and through the by-pass may be regulated. In furnace H nitrates, derived from a source presently to be explained, are roasted, and from the roasting action nitrogen peroxid is derived. Probably the gaseous derivative is a mixture of various oxids of nitrogen, but it is the oxids which readily surrender a portion of their oxygen which are important to my process; accordingly, it is the oxids having the characteristic just defined with which I am concerned, and of these nitrogen peroxid, $NO_2$, is typical.

In section 5 of the line of gas circulation a drip tank K is arranged. Its primary function is indicated by its name; in it are collected such small quantities of liquid as are carried from tank B in the stream of gas. Into it too is an air induction port, conveniently a lead 14 from a low-pressure air line, through which fresh supplies of air may gain ingress.

Operation of the gas-circulating system thus far described will have this effect: The stream will, by virtue of the presence of furnace H, carry sufficient quantities of oxids of nitrogen. Continually in tank K fresh quantities of oxygen are being added to the stream of spent oxid of nitrogen coming from tank B and combining to form higher oxids of nitrogen, while continually in tank B oxygen is being taken from the nitrogen peroxid. The consequence is that the circulating gaseous stream becomes more and more heavily loaded with nitrogen, and this accumulation of nitrogen, will continue to a point beyond which it is not economical to proceed. When that point is reached, a valve 10 in pipe 4 is closed and a valve 11 is opened in a pipe 12 through which the gas coming from tank B is conducted away to a tank E. This stream of gas will be heavy with oxid of nitrogen and will of course contain free oxygen besides. In tank E the spent gases are caused to bubble through a body of liquid (ordinarily water) in which is present (in solution or in suspension) a salt suitable for nitrogen oxid recovery. A suitable salt is carbonate of calcium, another is milk of lime. This body of liquid is, in the case of the calcium salts mentioned, kept hot through the instrumentality of a steam coil 13. (Of course a percolating tower might be used for effecting the desired mingling of gas with calcium salt solution.) By the ensuing reaction nitrates and nitrites of calcium are formed in tank E. Gas is admitted into a unit volume of solution in tank E until the hot solution is saturated with nitrogen containing salts. It is then pumped into a tank F, where it grows cold. Cooling effects precipitation of a large part of the nitrogen salts. These salts so precipitated are the nitrates (and nitrites) which are conveyed to furnace H, where roasting takes place, in the manner and for the ends already described.

It will be understood that the nitrogen containing salts which according to the foregoing description are roasted in a furnace, might instead be treated with a stronger acid to attain the same end, the release namely of oxids of nitrogen, effective to the ends already described.

It remains to speak of the particular showing of Fig. II. Here are four oxidizing tanks, B, B', B", and B''', arranged, not in parallel, but in series. The tanks are connected by siphon tubes, so that a proper control of the outlet of solution from tank C will effect the flow of solution from tank to tank, and through the last tube of the series the oxidized solution is carried into the boiling tank C. From each tank in turn the gas is gathered and blown through the body of solution in the next succeeding tank. (Manifestly the solution and the gas here shown to advance in the same direction, might be caused to advance counter-current, one to the other). The boiling tank C is so shaped, as by baffle plates 15, that there is flow of a stream of solution from inlet through circuitous course to the outlet 16, which, as will be understood leads to a settling tank, such as D, Fig. 1. With these few comments, the arrangement shown in Fig. II will be readily understood. And it will further be apparent that herein is an apparatus for continuous operation as distinguished from the unit by unit operation of Fig. I.

I have in this specification shown and described apparatus, to the use of which in its specific forms the method of my invention is by no means limited. Furthermore, I have in this description entered into details of method which are not of the essence of my invention in its broader aspect. These details are given in an exemplary way merely. In the ensuing claims I define the invention in its essential features; if these be employed, my invention will be practised, whatever be the departure in detail from what I have described.

I claim as my invention:

1. The method herein described of performing upon a spent pickling solution containing sulfate of iron a reclaiming operation, which consists in intimately mingling with the spent solution a gaseous body containing a higher oxid of nitrogen, and in subsequently recovering from the gaseous body spent in the performance of the preceding step its nitrogen ingredient by intimately mingling it with a salt capable of reacting with and retaining oxids of nitrogen.

2. The method herein described of conducting upon a spent pickling solution containing sulfate of iron a reclaiming operation, which consists in causing a stream of gas containing a higher oxid of nitrogen to percolate first through the solution to be reclaimed and then through a solution of salt capable of reacting with and retaining oxid of nitrogen, deriving from the resulting precipitate in the second solution a higher oxid of nitrogen, and introducing the higher oxid of nitrogen so derived into the gaseous stream as it flows to the first solution.

3. The method herein described of reclaiming spent pickling solution containing sulfate of iron, which consists in circulating through a body of spent solution a stream of gas containing oxids of nitrogen, adding to the stream as it circulates fresh supplies of higher oxids of nitrogen and air, and then, as the gaseous stream becomes burdened with nitrogen, diverting it and intimately mingling it with a body of a salt capable of reacting with and retaining oxids of nitrogen.

4. The method herein described of treating spent pickling solutions laden with sulfate of iron which consists in roasting nitrates, bringing the resultant gas into intimate contact with the spent solution, conducting the gas which comes from such contact into a solution of a salt capable of reacting with an oxid of nitrogen to form a nitrogen salt, separating thence the nitrogen salt produced, and using such nitrogen salt as the material for roasting in the further operation.

5. The herein described method of treating spent pickling solutions laden with sulfate of iron which consists in causing a gaseous stream flowing in closed cycle to intimately intermingle with the said solution, and in causing said stream to receive in the course of its cycle accessions of atmospheric air and of oxid of nitrogen.

6. The herein described method of treating spent pickling solutions laden with sulfate of iron which consists in maintaining in a suitable receptacle a body of the solution to be treated and in a suitable adjacent receptacle a body of nitrogen salts at elevated temperature, and in causing a gaseous stream to flow in closed cycle over such heated body of nitrogen salts, thence through such body of solution, and then eventually back again to said body of nitrogen salts, while admitting air to the flowing stream between its exit from the solution and its access to the body of nitrogen salts.

7. The method herein described of treating spent pickling solution laden with sulfate of iron, which consists in causing a gaseous stream containing an oxid of nitrogen together with free oxygen to come into intimate contact with the spent solution, bringing the gas, after it has emerged from such intimate contact with pickling solution, into intimate contact with a solution of a salt capable of reacting with an oxid of nitrogen to form a salt of nitrogen, separating the nitrogen containing salt so produced, and deriving from the nitrogen containing salt so produced new supplies of oxid of nitrogen, and introducing the oxid of nitrogen so derived into the stream of gas entering the pickling solution in its further treatment.

In testimony whereof I have hereunto set my hand.

JOSEPH A. SHAW.

Witness:
FRANCIS J. TOMASSON.